US012197439B2

(12) United States Patent
Ahmed et al.

(10) Patent No.: US 12,197,439 B2
(45) Date of Patent: Jan. 14, 2025

(54) OUTER SEMI JOIN FOR DISJUNCTIVE SUBQUERY UNNESTING

(71) Applicant: Oracle International Corporation, Redwood Shores, CA (US)

(72) Inventors: Rafi Ahmed, Fremont, CA (US); Angela Amor, Menlo Park, CA (US); Mohamed Ziauddin, Pleasanton, CA (US)

(73) Assignee: Oracle International Corporation, Redwood Shores, CA (US)

( * ) Notice: Subject to any disclaimer, the term of this patent is extended or adjusted under 35 U.S.C. 154(b) by 0 days.

(21) Appl. No.: 17/966,036

(22) Filed: Oct. 14, 2022

(65) Prior Publication Data

US 2024/0126757 A1 Apr. 18, 2024

(51) Int. Cl.
*G06F 16/2453* (2019.01)
(52) U.S. Cl.
CPC .. *G06F 16/24544* (2019.01); *G06F 16/24535* (2019.01); *G06F 16/24537* (2019.01)
(58) Field of Classification Search
CPC ......... G06F 16/24544; G06F 16/24537; G06F 16/24535
See application file for complete search history.

(56) References Cited

U.S. PATENT DOCUMENTS 6,496,819 B1 * 12/2002 Bello ................ G06F 16/24539

OTHER PUBLICATIONS

M. Brantner, N. May and G. Moerkotte, "Unnesting scalar sql queries in the presence of disjunction", ICDE. (Year: 2007).*

* cited by examiner

*Primary Examiner* — Kannan Shanmugasundaram
(74) *Attorney, Agent, or Firm* — Hickman Becker Bingham Ledesma LLP; Albert Lee

(57) ABSTRACT

A new type of table join operation, outer semi join (OSJ), is provided, which can be used by an optimizer layer and an execution layer of a database management system (DBMS). OSJ combines the semantics of both left outer-join and semi-join. The concept of an anti-join marker (AJM) is also introduced, which specifies whether a matching row was not found between joined tables for each result row in an OSJ operation. The OSJ operation supports unnesting of a class of disjunctive ANY, ALL, EXISTS, NOT EXISTS, IN, and NOT IN subqueries for execution plan optimization. The disjunction may contain filter predicates. For unnesting, OSJ avoids the need of using a distinct operator on the right table and also supports using inequality (e.g. >, >=, <, <=) in connecting or correlating conditions of subqueries, rather than being limited to equality only.

20 Claims, 12 Drawing Sheets

FIG. 2A

Table T1

| A1 | B1 | C1 |
|----|----|----|
| 1  | 5  | 3  |
| 2  | 7  | 4  |
| 3  | 9  | 11 |
| 4  | 8  | 12 |
| 5  | 6  | 2  |

Table T2

| A2 | B2 | C2 |
|----|----|----|
| 1  | 3  | 2  |
| 2  | 7  | 6  |
| 2  | 4  | 1  |
| 4  | 5  | 7  |
| 7  | 6  | 9  |

FIG. 2B

▨ Match all rows
▩ Match 1st row

INTERNAL QUERY 225A (Left Outer Join)

```
SELECT T1.a1, T1.b1, T2.c2
FROM T1 LEFT OUTER JOIN T2 on T1.a1 = T2.a2;
```

INTERNAL QUERY 225B (Semi Join)

```
SELECT T1.a1, T1.b1
FROM T1 semi join T2 on T1.a1 = T2.a2;
```

INTERNAL QUERY 225C (Anti Join)

```
SELECT T1.a1, T1.b1
FROM T1 anti join T2 on T1.a1 = T2.a2;
```

INTERNAL QUERY 225D (Outer Semi Join)

```
SELECT T1.a1, T1.b1, NVL2(T2.rowid, 0, 1) AJM
FROM T1 OUTER SEMI JOIN T2 on T1.a1 = T2.a2;
```

FIG. 2C

RESULT 226A

| A1 | B1 | C2   |
|----|----|------|
| 1  | 5  | 2    |
| 2  | 7  | 6    |
| 2  | 7  | 1    |
| 3  | 9  | NULL |
| 4  | 8  | 7    |
| 5  | 6  | NULL |

RESULT 226B

| A1 | B1 |
|----|----|
| 1  | 5  |
| 2  | 7  |
| 4  | 8  |

RESULT 226C

| A1 | B1 |
|----|----|
| 5  | 6  |
| 3  | 9  |

RESULT 226D

| A1 | B1 | AJM |
|----|----|-----|
| 1  | 5  | 0   |
| 2  | 7  | 0   |
| 3  | 9  | 1   |
| 4  | 8  | 0   |
| 5  | 6  | 1   |

FIG. 3A

EXTERNAL QUERY 342 (Q1)

```
SELECT T1.hundred, T1.thousand
FROM T_5K T1
WHERE T1.unique3 > 19 and
      (T1.hundred IN
          (SELECT hundred
           FROM G_4K T2      ⎤ — DISJUNCTIVE SUBQUERY 344A
           WHERE hundred > 5)⎦
       OR T1.ten = 1 OR T1.ten = 2);
```

FIG. 3B

INTERNAL QUERY 325 (Q2)

```
SELECT T1.hundred, T1.thousand
FROM T_5K T1, G_4K T2
WHERE T1.unique3 > 19 and
      T2.hundred > 5 and
      T1.hundred OSJ= T2.hundred and
      (T1.ten = 1 OR T1.ten = 2 OR
       T2.AJM = 0);
```

FIG. 3C

EXECUTION PLAN 324 (For Q2)

```
---------------------------------------------------------------------
| Id  | Operation             | Name         | Rows  | Cost (%CPU)|
---------------------------------------------------------------------
|  0  | SELECT STATEMENT      |              | 1845  |   27  (12)|
|* 1  |  FILTER               |              |       |           |
|* 2  |   HASH JOIN OUTERSEMI |              | 1845  |   27  (12)|
|* 3  |    TABLE ACCESS FULL  | T_5K         | 2490  |   24   (9)|
|* 4  |    INDEX RANGE SCAN   | G_4K_HUNDRED |  367  |    2   (0)|
---------------------------------------------------------------------
Predicate Information (identified by operation id):
---------------------------------------------------
   1 - filter("T2"."AJM" = 0 OR "T1"."TEN"=1 OR "T1"."TEN"=2)
   2 - access("T1"."HUNDRED"="T2"."HUNDRED")
   3 - filter("T1"."UNIQUE3">19)
   4 - access("T2"."HUNDRED">5)
```

FIG. 4A

```
                    EXTERNAL QUERY 442 (Q3)

SELECT T1.x, T1.y
FROM T1, T5
WHERE T1.k = T5.k and T1.z > 19 and
      (NOT EXISTS (SELECT T2.p
                   FROM T2
                   WHERE T1.p = T2.p and T2.d > 5)     ⎬─ 444A
    OR T5.q > ANY (SELECT T3.q
                   FROM T3            ⎬─ 444B
                   WHERE T3.f = 7)
    OR T1.h = 1 OR T5.g = 99);
```

FIG. 4B

```
                    INTERNAL QUERY 425 (Q4)

SELECT T1.x, T1.y
FROM T1, T2, T3, T5
WHERE T1.z > 19 and T1.k = T5.k and
      T1.p OSJ= T2.p and T2.d > 5 and
      T5.q OSJ> T3.q and T3.f = 7 and
      (T1.h = 1 OR T5.g = 99 OR T2.AJM = 1 OR T3.AJM = 0);
```

FIG. 5A

EXTERNAL QUERY 542 (Q5)

```
SELECT *
FROM T1, T2, T3
WHERE T1.x = T2.x and T1.z = T3.z (+) and T2.w = T3.w (+);
```

FIG. 5B

JOIN ORDER 560A (For Q5)

Tables in the first joins (Option 1):   {T1, T2}
Tables in the second joins (Option 1):  {T1, T2, T3}

Join order option 1/2:   (T1, T2, T3)
Join order option 2/2:   (T2, T1, T3)

FIG. 5C

JOIN ORDER 560B (For Q2)

Tables in the first join (Option 1):  {T1, T2}

Join order option 1/1:                (T1, T2)

FIG. 5D

JOIN ORDER 560C (For Q4)

Tables in the first join (Option 1):    {T1, T5}
Tables in the second join (Option 1):   {T1, T5, T2}
Tables in the third join (Option 1):    {T1, T5, T2, T3}

Join order option 1/4:   (T1, T5, T2, T3)
Join order option 2/4:   (T5, T1, T2, T3)
Join order option 3/4:   (T1, T5, T3, T2)
Join order option 4/4:   (T5, T1, T3, T2)

FIG. 6

ANTI JOIN MARKER (AJM) 670 (Plan for Q2)

1. Set T2.AJM to 2 for rows where (T1.ten = 1 OR T1.ten = 2) is satisfied
2. Set T2.AJM to 0 for rows where
    some T2 row satisfies T1.hundred = T2.hundred
3. Set T2.AJM to 1 otherwise AJM value definitions:
0: Matching row is found / Anti-join marker is 0
1: Matching row is not found / Anti-join marker is set to 1
2: Disjunctive filter predicates evaluate to true

FIG. 7A

```
EXECUTION PLAN 724 (For Q4, Join Order Option 3/4: T1, T5, T3, T2)

0 SELECT STATEMENT
1 FILTER                          <- filter T2.AJM=1 or
                                     T3.AJM=0 or T1.h=1 or T5.g=99
2  OSJ                            <- (B)
3   OSJ                           <- (A)
4    HASH JOIN                    <- join on T1.k = T5.k
5     TABLE ACCESS FULL T1        <- filter T1.z > 19
6     TABLE ACCESS FULL T5
7    TABLE ACCESS FULL T3         <- filter T3.f = 7
8   TABLE ACCESS FULL T2          <- filter T2.d > 5
```

FIG. 7B

ANTI JOIN MARKER (AJM) 770 (Plan for Q4)

A. T3.AJM
1. Set T3.AJM to 2 for rows where (T1.h = 1 OR T5.g = 99) is satisfied
2. Set T3.AJM to 0 for rows where
    some T3 row satisfies T5.q > T3.q
3. Set T3.AJM to 1 otherwise B. T2.AJM
1. Set T2.AJM to 2 for rows where
    (T1.h = 1 OR T5.g = 99 or T3.AJM = 0) is satisfied
2. Set T2.AJM to 0 for rows where
    some T2 row satisfies T1.p = T2.p
3. Set T2.AJM to 1 otherwise

FIG. 8

```
                    EXTERNAL QUERY 842 (Q6)

SELECT T1.x
FROM T1, T2
WHERE T1.y = T2.y and
      (T2.x IN (SELECT T3.a
                FROM T3
                WHERE T3.a = T2.x)
       OR
       EXISTS (SELECT 1
               FROM T4, T5
               WHERE T4.k = T5.k and
                     T4.m > 1 and T4.b = T2.x));
```

```
                    INTERNAL QUERY 825A (Q7)

SELECT T1.x
FROM T1, T2,
     (SELECT T3.a as Z
      FROM T3
      UNION ALL
      SELECT T4.b AS Z
      FROM T4, T5
      WHERE T4.k = T5.k and T4.m > 1) V
WHERE T1.y = T2.y and T2.x S= V.Z;
```

```
                    INTERNAL QUERY 825B (Q7o)

SELECT T1.x
FROM T1, T2, T3, (SELECT T4.b
                  FROM T4, T5
                  WHERE T4.k = T5.k and T4.m > 1) V
WHERE T1.y = T2.y and T2.x OSJ= T3.a and T2.x OSJ= V.b
      (T3.AJM = 0 OR V.AJM = 0);
```

FIG. 9

```
                    EXTERNAL QUERY 942 (Q8)

SELECT T1.ten
FROM G_4K T1
WHERE EXISTS (SELECT 1
              FROM H_4K T2, T_5K T3
              WHERE T2.thousand = T3.thousand and
                    T2.ten > 7 AND
                    (T2.hundred = T1.hundred OR
                    T3.ten = T1.hundred));
```

```
                    INTERNAL QUERY 925A (Q9)

SELECT T1.ten
FROM G_4K T1,
     (SELECT T2.hundred Z
      FROM H_4K T2, T_5K T3
      WHERE T2.thousand = T3.thousand AND T2.ten > 7
      UNION ALL
      SELECT T3.ten Z
      FROM H_4K T2, T_5K T3
      WHERE T2.thousand = T3.thousand AND T2.ten > 7) V
WHERE T1.hundred S= V.Z;
```

```
                    INTERNAL QUERY 925B (Q10)

SELECT T1.ten
FROM G_4K T1,
     (SELECT T2.hundred Z
      FROM H_4K T2, T_5K T3
      WHERE T2.thousand = T3.thousand AND T2.ten > 7) V1,
     (SELECT T3.ten Z
      FROM H_4K T2, T_5K T3
      WHERE T2.thousand = T3.thousand AND T2.ten > 7) V2
WHERE T1.hundred OSJ= V1.Z and T1.hundred OSJ= V2.Z and
      (V1.AJM = 0 OR V2.AJM = 0);
```

OUTER SEMI JOIN FOR DISJUNCTIVE SUBQUERY UNNESTING

FIELD OF THE INVENTION

The present disclosure relates to techniques for optimizing execution of database queries. More specifically, the disclosure relates to supporting a new type of join operation, referred to herein as outer semi join (OSJ), to optimize execution of database queries.

BACKGROUND

A database management system (DBMS) may introduce one or more table join operations in an execution plan for a database query to assist in optimizing performance when the execution plan is performed. For example, a semi-join operation may be used for the unnesting of EXISTS and ANY subqueries. An anti join operation may be used for the unnesting of NOT EXISTS and ALL subqueries and the conversion of the MINUS operator.

When a subquery is unnested, the optimizer layer of the DBMS can consider the impact of unnested subquery's tables anti-/semi-/inner/outer-joins when evaluating potential access paths and join methods and join orders in the execution plan. Further, repeated evaluations of the subquery can also be avoided when the subquery is unnested. In this manner, performance benefits can be realized when the execution layer of the DBMS performs an execution plan that is optimized and transformed with the unnesting of subqueries.

While the above described use of semi-join and anti join operations to unnest subqueries in execution plans can help to optimize performance, these approaches may fail to provide an optimized execution plan for certain complex database queries that are common in many data processing workloads.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

The example embodiment(s) of the present invention are illustrated by way of example, and not in way by limitation, in the figures of the accompanying drawings and in which like reference numerals refer to similar elements and in which:

FIG. 2A depicts example database tables T1 and T2.

FIG. 2B depicts example internal database queries shown in a structured query language (SQL) like syntax for use within an execution plan.

FIG. 2C depicts result rows from processing the internal database queries of FIG. 2B with the tables from FIG. 2A.

FIG. 3A depicts an example database query with a subquery in disjunction.

FIG. 3B depicts the database query of FIG. 3A with the subquery unnested using outer semi-join.

FIG. 3C depicts an example execution plan determined for the database query of FIG. 3B.

FIG. 4A depicts an example database query with multiple subqueries in disjunction.

FIG. 4B depicts the database query of FIG. 4A with the subqueries unnested using outer semi-join.

FIG. 5A depicts an example database query with inner and left outer joins.

FIG. 5B depicts a join order for the database query of FIG. 5A.

FIG. 5C depicts a join order for the database query of FIG. 3B.

FIG. 5D depicts a join order for the database query of FIG. 4B.

FIG. 6 depicts an example determination of an anti-join marker (AJM) for table T2 in the execution plan of FIG. 3C.

FIG. 7A depicts an example execution plan using join order option 3/4 of FIG. 5D.

FIG. 7B depicts an example determination of anti-join markers (AJMs) for tables T2 and T3 in the execution plan of FIG. 7A.

FIG. 8 depicts an example database query using a first class of disjunctive subqueries and proposed unnested versions in a conventional manner and with OSJ.

FIG. 9 depicts an example database query using a second class of disjunctive subqueries and proposed unnested versions in a conventional manner and with OSJ.

DETAILED DESCRIPTION

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

General Overview

As discussed above, existing approaches have limitations for optimizing execution plans of certain complex database queries that are common in many data processing workloads. For example, database queries with disjunctive ("or") subqueries and filter predicates in disjunction are generally not optimizable using existing approaches.

Accordingly, a new type of table join operation, outer semi join (OSJ), is provided. OSJ combines the semantics of both left outer-join (also referred to as left-join) and semi-join. The concept of an anti join marker (AJM) is also introduced, which specifies whether a matching row was found between joined tables for each result row in an OSJ operation or not found. The OSJ operation supports unnesting of a class of disjunctive ANY, ALL, EXISTS, and NOT EXISTS subqueries for execution plan optimization. For unnesting, OSJ avoids the need of using a distinct operator on the right table and also supports using inequality (e.g., >, >=, <, <=) in connecting or correlating conditions of subqueries, rather than being limited to equality only.

Example disjunctive subqueries that can be processed using OSJ include: (a) a subquery in disjunction with a filter predicate; (b) a first subquery in disjunction with a second subquery; (c) a first subquery in disjunction with a second subquery in disjunction with a filter predicate; (d) any number of disjunctive subqueries in disjunction with any number of filter predicates, and (e) disjunctive correlated predicates in one or more subqueries (as shown in external query 942 (Q8) of FIG. 9).

By supporting unnesting for database queries with subqueries and filter predicates in disjunction, an optimizer layer of a DBMS can provide highly optimized execution plans for a broader range of database queries supporting various data processing workloads. Accordingly, when the execution plans are later executed by the execution layer of the DBMS, the database queries can benefit from reduced execution time, optimized resource usage, smaller memory footprint, lower power consumption, and other performance benefits.

Network Arrangement Architecture

Figure 1:
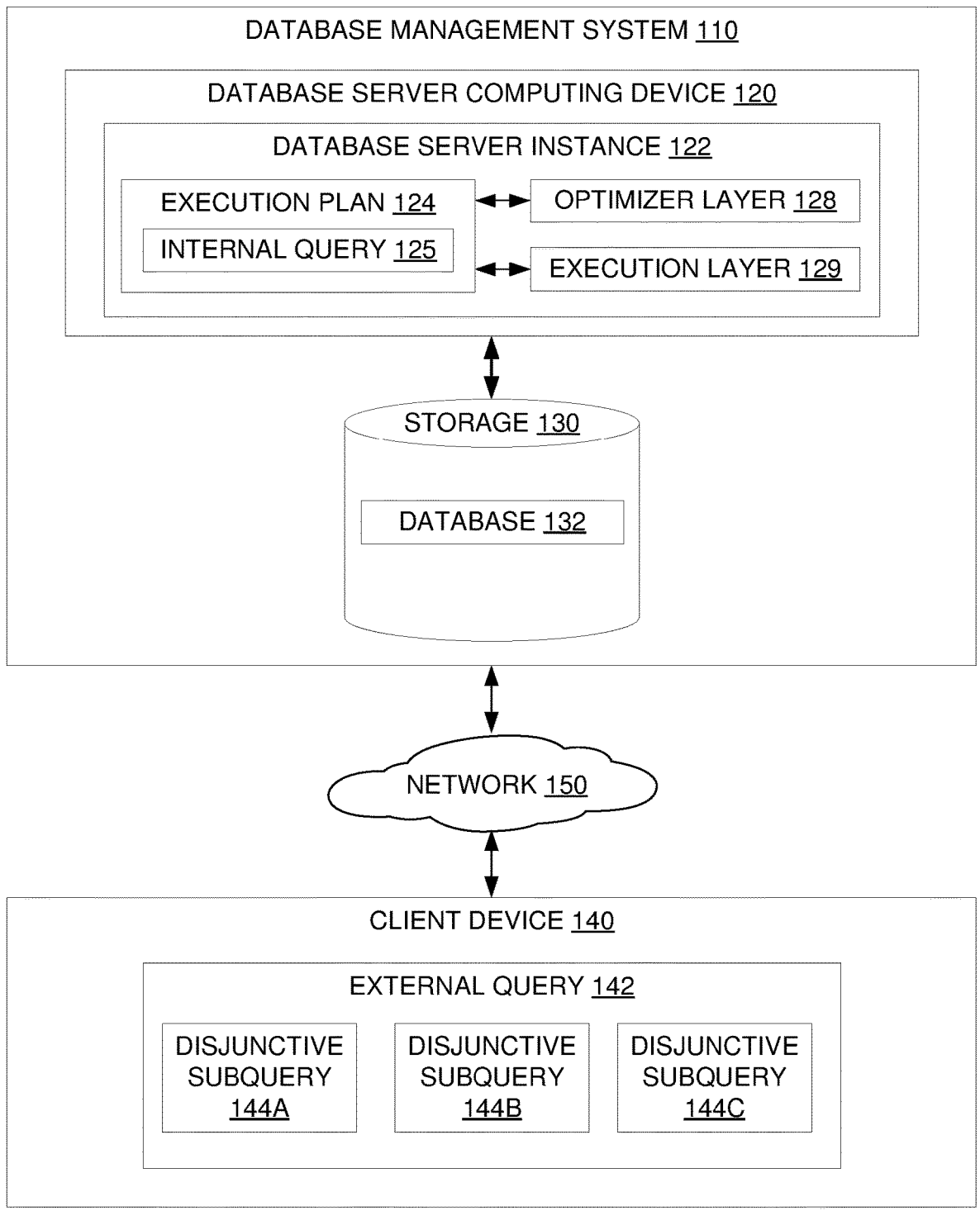
FIG. 1 is a block diagram that depicts an example network arrangement for a database management system (DBMS) in which outer semi-join (OSJ) operations may be supported.

FIG. 1 is a block diagram that depicts an example network arrangement 100 for a database management system 110, according to one or more embodiments. Network arrangement 100 includes a client device 140 and a database server computing device 120 communicatively coupled via a network 150. Network 150 may be implemented with any type of medium and/or mechanism that facilitates the exchange of information between client device 140 and server device 120. Example network arrangement 200 may include other devices, including client devices, server devices, storage devices, and display devices, according to one or more embodiments.

Client device 140 may be implemented by any type of computing device that is communicatively connected to network 150. In network arrangement 100, client device 140 is configured with a database client, which may be implemented in any number of ways, including as a stand-alone application running on client device 140, or as a plugin to a browser running at client device 140, etc. Client device 140 may submit one or more database queries, including external query 142, to database management system 110. As shown in FIG. 1, external query 142 may include one or more disjunctive subqueries, or disjunctive subquery 144A, disjunctive subquery 144B, and disjunctive subquery 144C. Client device 140 may be configured with other mechanisms, processes and functionalities, depending upon a particular implementation.

In network arrangement 100, database server computing device 120 is configured with a database server instance 122. Database server computing device 120 is implemented by any type of computing device that is capable of communicating with client device 140 over network 150 and also capable of running database server instance 122.

Database server instance 122 on database server computing device 120 maintains access to and manages data in database 132 (i.e., on storage 130). According to one or more embodiments, access to a given database comprises access to (a) a set of disk drives storing data for the database, and (b) data blocks stored thereon. Database 132 may reside in any type of storage 130, including volatile and non-volatile storage, e.g., random access memory (RAM), one or more hard disks, main memory, etc.

Database server instance 122 includes optimizer layer 128 and execution layer 129. Optimizer layer 128 may generate and optimize one or more execution plans, including execution plan 124, to process external query 142 received from client device 140. Execution layer 129 may execute execution plan 124 to process external query 142 using database 132. The result rows from execution layer 129 may then be provided back to client device 140.

Any of the functionality attributed to database server instance 122 or database management system 110 herein may be performed by any other entity, which may or may not be depicted in network arrangement 100, according to one or more embodiments. Server device 120 may be configured with other mechanisms, processes and functionalities, depending upon a particular implementation.

In an embodiment, each of the processes and/or functionality described in connection with database server instance 122, database management system 110, and/or database 132 are performed automatically and may be implemented using one or more computer programs, other software elements, and/or digital logic in any of a general-purpose computer or a special-purpose computer, while performing data retrieval, transformation, and storage operations that involve interacting with and transforming the physical state of memory of the computer.

Example Table Join Operations

FIG. 2A depicts example database tables T1 and T2. Database tables T1 and T2 may be stored in database 132. As shown in FIG. 2A, table T1 includes data columns A1, B1, and C1, with five rows or records of data, and table T2 includes data columns A2, B2, and C2, with five rows or records of data. Tables T1 and T2 of FIG. 2A are reproduced below:

TABLE T1

| A1 | B1 | C1 |
|----|----|----|
| 1  | 5  | 3  |
| 2  | 7  | 4  |
| 3  | 9  | 11 |
| 4  | 8  | 12 |
| 5  | 6  | 2  |

TABLE T2

| A2 | B2 | C2 |
|----|----|----|
| 1  | 3  | 2  |
| 2  | 7  | 6  |
| 2  | 4  | 1  |
| 4  | 5  | 7  |
| 7  | 6  | 9  |

Reproduction of FIG. 2A.

FIG. 2B depicts example internal queries 225A-225D shown in a structured query language (SQL) like syntax for use within an execution plan. Internal queries 225A-225D may correspond to internal query 125 from FIG. 1. For illustrative purposes, the SQL-like syntax allows for explicit definition of table joins that may be reserved for internal DBMS use, such as semi-join, anti-join, and outer semi join (OSJ). Accordingly, the SQL-like syntax may not conform to a formal SQL definition such as ANSI SQL.

FIG. 2C depicts result 226A, result 226B, result 226C, and result 226D from processing the respective internal queries 225A-225D of FIG. 2B with tables T1 and T2 from FIG. 2A. The results 226A-226D will be described in conjunction with FIG. 2B below.

Internal query 225A of FIG. 2B illustrates an example query using left outer join, wherein the left table or T1 drives the table join operation. All rows of table T1 are selected—those that do not match to T2 (the left side of the Venn diagram) and those that do match to T2 (the middle of the Venn diagram). Duplicate row matches are permitted, as indicated by the cross shading. For example, referring to the second and third rows in result 226A of FIG. 2C, it is observed that T1.A1=T2.A2 is matched twice for the second and third rows of table T2. Internal query 225A and result 226A are reproduced below:

| SELECT T1.a1, T1.b1, T2.c2 | | |
|---|---|---|
| FROM T1 LEFT OUTER JOIN T2 on T1. a1 = T2.a2; | | |
| A1 | B1 | C2 |
| 1 | 5 | 2 |
| 2 | 7 | 6 |
| 2 | 7 | 1 |
| 3 | 9 | NULL |
| 4 | 8 | 7 |
| 5 | 6 | NULL |

Reproduction of Portions of FIGS. 2B and 2C.

Internal query 225B of FIG. 2B illustrates an example query using semi-join, wherein the left table or T1 drives the table join operation. Only those rows of T1 are selected that match with any row of T2 (the middle of the Venn diagram). However, unlike an inner join, a semi-join only provides the first row that is matched, as indicated by the horizontal shading. For example, referring to result 226B in FIG. 2C, for the matching of T1.A1=T2.A2=2, it is observed that only the second row in T2 is matched to the second row in T1 to provide the second row in result 226B. Any further potential matching rows, such as the third row in T2, are not matched, and therefore do not contribute any rows to the results. Accordingly, rows from T1 are not duplicated in the results of the semi-join operation. Internal query 225B and result 226B are reproduced below:

| SELECT T1.a1, T1.b1 | |
|---|---|
| FROM T1 semi join T2 on T1.a1 = T2.a2; | |
| A1 | B1 |
| 1 | 5 |
| 2 | 7 |
| 4 | 8 |

Reproduction of Portions of FIGS. 2B and 2C.

Internal query 225C of FIG. 2B illustrates an example query using anti-join, wherein the left table or T1 drives the table join operation. Only those rows of T1 are selected that do not match with any row of T2 (the left side of the Venn diagram). Rows from T1 are not duplicated in the results of an anti join operation. Internal query 225C and result 226C are reproduced below:

| SELECT T1.a1, T1.b1 | |
|---|---|
| FROM T1 anti join T2 on T1.a1 = T2.a2; | |
| A1 | B1 |
| 5 | 6 |
| 3 | 9 |

Reproduction of Portions of FIGS. 2B and 2C.

Internal query 225D of FIG. 2B illustrates an example query using the new table join operation, or outer semi join (OSJ), wherein the left table or T1 drives the table join operation. As with left outer join, all rows of table T1 are selected—those that do not match to T2 (the left side of the Venn diagram) and those that do match to T2 (the middle of the Venn diagram). However, the rows that match to T2 are limited to the first matching row, as with semi-join. Accordingly, rows from T1 are not duplicated in the results of the outer-semi-join operation. Thus, it is observed that outer semi join combines the semantics of both left outer-join and semi-join. Internal query 225D and result 226D are reproduced below:

| SELECT T1.a1, T1.b1, NVL2(T2.rowid, 0, 1) AJM | | |
|---|---|---|
| FROM T1 OUTER SEMI JOIN T2 on T1.a1 = T2.a2; | | |
| A1 | B1 | AJM |
| 1 | 5 | 0 |
| 2 | 7 | 0 |
| 3 | 9 | 1 |
| 4 | 8 | 0 |
| 5 | 6 | 1 |

Reproduction of Portions of FIGS. 2B and 2C.

Further, database management system 110 may support the provision of an anti join marker (AJM) that defines, for each result row in an OSJ operation, whether the result row matches or not. For example, FIG. 6 provides one possible mapping of AJM values, wherein an AJM value of 0 indicates a matching row was found (center of the Venn diagram, or semi-join semantics), an AJM value of 1 indicates a matching row was not found (left of the Venn diagram, or anti join semantics), and an AJM value of 2 indicates that row evaluation was not performed. These AJM values may be assigned as part of a pre-filter operation, as described below under the heading "AUGMENTED ANTI JOIN MARKER". This is only one example mapping; other values may be assigned. As shown in internal query 225D, the expression "NVL2(T2.rowid, 0, 1) AJM" is another way to derive the AJM value: AJM is set to 0 when T2.rowid is not null (i.e. a valid matching row was found), and AJM is set to 1 when T2.rowid is null (i.e. matching row was not found).

Referring to result 226D, it is observed that result 226D is effectively the combination of result 226B (semi-join) and result 226C (anti-join), with the AJM field indicating whether the result was from semi-join (AJM=0) or anti join (AJM=1). Thus, an OSJ operation can also be described as a combination of semi-join and anti join semantics.

Example Query Unnesting: Single Disjunction

FIG. 3A depicts external query 342 (Q1) with disjunctive subquery 344A. External query 342 may correspond to external query 142, disjunctive subquery 344A may correspond to disjunctive subquery 144A, internal query 325 may correspond to internal query 125, and execution plan 324 may correspond to execution plan 124. External query 342 is reproduced below (note that tables "T_5K" and "G_4K" are assigned respective names "T1" and "T2"):

| Query Q1. |
|---|
| SELECT T1.hundred, T1.thousand |
| FROM T_5K T1 |
| WHERE T1.unique3 > 19 and |
| (T1.hundred IN |
| (SELECT hundred |

-continued

Query Q1.

FROM G_4K T2
WHERE hundred > 5)
OR T1.ten = 1 OR T1.ten = 2);

As shown in external query 342, disjunctive subquery 344A, or "IN (SELECT hundred FROM G_4K T2 WHERE hundred >5)" is in disjunction ("OR") with the predicate "T1.ten IN (1, 2)", or disjunctive filter predicates. By using outer semi join, disjunctive subquery 344A can be unnested, as shown in the corresponding internal query 325 (Q2), reproduced below.

Query Q2.

SELECT T1.hundred, T1.thousand
FROM T_5K T1, G_4K T2
WHERE T1.unique3 > 19 and
T2.hundred > 5 and
T1.hundred OSJ= T2.hundred and
(T1.ten = 1 OR T1.ten = 2 OR
T2.AJM = 0);

FIG. 3B depicts internal query 325 (Q2), which corresponds to external query 342 (Q1) of FIG. 3A with disjunctive subquery 344A unnested using outer semi-join. The subquery is unnested by including the "G_4K T2" table in the FROM clause, including "T2.hundred>5" and "T1.hundred OSJ=T2.hundred" as additional conjunctions ("AND") in the WHERE clause, wherein "OSJ=" indicates matching fields by equality using outer semi join, and adding "T2.AJM=0" as an additional disjunction ("OR") in the "T1.ten IN (1, 2)" clause, or the disjunctive filter predicates. T2.AJM is matched to "0" since the associated statement is "T1.hundred IN", indicating a semi-join rather than an anti-join.

FIG. 3C depicts a simple execution plan 324 determined for internal query 325 (Q2) of FIG. 3B. Execution plan 324, reproduced below, illustrates one possible execution plan for internal query 325 (Q2). In the example shown, the outer semi join (performed using a hash join method) is performed first at line 2 (Id=2), and then the disjunctive filter predicates are evaluated at line 1 (Id=1). Note that in this example, the hash join is performed for all rows, but in an optimized execution of outer semi-join, a pre-filter may be used to avoid row evaluation in outer semi-join when any of the disjunctive filter predicates are satisfied, as described further below under the heading "AUGMENTED ANTI JOIN MARKER".

| Id | Operation | Name | Rows | Cost (% CPU) |
|----|-----------|------|------|--------------|
| 0 | SELECT STATEMENT | | 1845 | 27 (12) |
| * 1 | FILTER | | | |
| * 2 | HASH JOIN OUTERSEMI | | 1845 | 27 (12) |
| * 3 | TABLE ACCESS FULL | T_5K | 2490 | 24 (9) |
| * 4 | INDEX RANGE SCAN | G_4K_HUNDRED | 367 | 2 (0) |

Predicate Information (identified by operation id):
1 - filter("T2"."AJM" = 0 OR "T1"."TEN" = 1 OR "T1"."TEN" = 2)
2 - access("T1"."HUNDRED" = "T2"."HUNDRED")
3 - filter("T1"."UNIQUE3" > 19)
4 - access ("T2"."HUNDRED" > 5)

Reproduction of FIG. 3C.
Example Query Unnesting: Multiple Disjunction

FIG. 4A depicts external query 442 (Q3) with disjunctive subquery 444A and disjunctive subquery 444B. External query 442, reproduced below, may correspond to external query 142, disjunctive subquery 444A may correspond to disjunctive subquery 444A, disjunctive subquery 444B may correspond to disjunctive subquery 444B, and internal query 425 may correspond to internal query 125.

Query Q3.

SELECT T1.x, T1.y
FROM T1, T5
WHERE T1.k = T5.k and T1.z > 19 and
(NOT EXISTS (SELECT T2.p
FROM T2
WHERE T1.p = T2.p and T2.d > 5)
OR T5.q > ANY (SELECT T3.q
FROM T3
WHERE T3.f = 7)
OR T1.h = 1 OR T5.g = 99);

As shown in external query 442 (Q3), disjunctive subquery 444A, or "NOT EXISTS (SELECT T2.p FROM T2 WHERE T1.p=T2.p and T2.d>5)" is in disjunction ("OR") with disjunctive subquery 444B, or "ANY (SELECT T3.q FROM T3 WHERE T3.f=7)"; both subqueries are further in disjunction with the disjunctive filter predicates, "T1.h=1 OR T5.g=99". External query 442 (Q3) may be unnested into internal query 425 (Q4), reproduced below:

Query Q4.

SELECT T1.x, T1.y
FROM T1, T2, T3, T5
WHERE T1.z > 19 and T1.k = T5.k and
T1.p OSJ= T2.p and T2.d > 5 and
T5.q OSJ> T3.q and T3.f = 7 and
(T1.h = 1 OR T5.g = 99 OR T2.AJM = 1 OR T3.AJM = 0);

FIG. 4B depicts internal query 425 (Q4), which corresponds to external query 442 (Q3) of FIG. 4A with disjunctive subqueries 444A and 444B unnested using outer semi-join. Disjunctive subquery 444A is unnested by including the "T2" table in the FROM clause, including "T1.p OSJ=T2.p and T2.d>5" as an additional conjunction ("AND") in the WHERE clause, wherein "OSJ=" indicates matching fields by equality using outer semi join, and adding "T2.AJM=1" as an additional disjunction ("OR") in the disjunctive filter predicates "T1.h=1 OR T5.g=99". T2.AJM is equal to "1" since the associated statement is "NOT EXISTS", indicating an anti-join rather than a semi-join.

Similarly, disjunctive subquery 444B is unnested by including the "T3" table in the FROM clause, including "T5.q OSJ>T3.q and T3.f=7" as an additional conjunction ("AND") in the WHERE clause, wherein "OSJ>" indicates greater than (rather than equal to) using outer semi join, and adding "T3.AJM=0" as an additional disjunction ("OR") in the disjunctive filter predicates, "T1.h=1 OR T5.g=99" clause. T3.AJM is equal to "0" since the associated statement is "ANY", indicating a semi-join rather than an anti-join.

In general, the unnesting of IN, ANY, and EXISTS subqueries result in semi-join (i.e., outer semi join with AJM equal to 0) and the unnesting of NOT IN, ALL, and NOT EXISTS subqueries result in anti join (i.e., outer semi join with AJM equal to 1).

Thus, as demonstrated above in conjunction with FIGS. 3A-3B and FIGS. 4A-4B, any number of disjunctive subqueries in a single database query can be unnested using outer semi-join.

Partial Join Order

FIG. 5A depicts an example external query 542, reproduced below as Q5, with inner and left outer joins. For example, the joins "T1.z=T3.z (+)" and "T2.w=T3.w (+)" are left outer joins, while the join "T1.x=T2.x" is an inner join. When a table participates in an asymmetric join, such as left outer join, anti-join, semi-join, outer semi-join etc., the optimizer layer 128 may enforce a partial join order such that the outer-/semi-/anti-joined table(s) (e.g., T3) must succeed the table(s) (e.g., T1 and T2) it is joined to in the left-to-right join order.

---
Query Q5.
---
SELECT *
FROM T1, T2, T3
WHERE T1.x = T2.x and T1.z = T3.z (+) and T2.w = T3.w (+);
---

For external query 542 (Q5), enforcing the partial join order means that T3 (the left outer joined table) comes after T1 and T2 in the join order. Thus, as shown in join order 560A of FIG. 5B, the first joins include tables T1 and T2, and the second join includes table T3. Thus, the valid left-to-right join orders are 1/2 (T1, T2, T3) and 2/2 (T2, T1, T3). Optimizer layer 128 may select a specific join order option based on efficiency (e.g., by choosing the join order option with the lowest projected cost). Join order 560A is reproduced below:

Tables in the first join (Option 1): {T1, T2}
Tables in the second join (Option 1): {T1, T2, T3}
Join order option 1/2: (T1, T2, T3)
Join order option 2/2: (T2, T1, T3)

Reproduction of FIG. 5B.

For outer semi join, in enforcing join order there is an additional requirement that in valid join orders all tables referenced in disjunctive filter predicates must precede all the outer-semi-joined tables. This allows the evaluation of disjunctive filter predicates before any outer semi-join takes place.

For internal query 325 (Q2), there is only a single outer semi join with T2 ("T1.hundred OSJ=T2.hundred"). Since outer semi join shares the semantics of left outer join, it is considered an asymmetric join. Thus, as shown in join order 560B of FIG. 5C, there is only one possible join order option 1/1 (T1, T2). Join order 560B is reproduced below:

Tables in the first join (Option 1): {T1, T2}
Join order option 1/1: (T1, T2)

Reproduction of FIG. 5C.

For internal query 425 (Q4), there are two outer semi joins with T2 and T3 ("T1.p OSJ=T2.p" and "T5.q OSJ>T3.q"), and a single inner join with T1 and T5 ("T1.k=T5.k"). For the two outer semi joins, tables T2 and T3 become part of the disjunctive filter predicates (T2.AJM=1 OR T3.AJM=0), which are ordered to join after the other tables. Thus, as shown in join order 560C of FIG. 5D, there are four possible join order options: 1/4 (T1, T5, T2, T3), 2/4 (T5, T1, T2, T3), 3/4 (T1, T5, T3, T2), and 4/4 (T5, T1, T3, T2). Optimizer layer 128 may select a specific join order option based on efficiency. Join order 560C (i.e., T1, T5, T2, T3) is reproduced below:

Tables in the first join (Option 1): {T1, T5}
Tables in the second join (Option 1): {T1, T5, T2}
Tables in the third join (Option 1): {T1, T5, T2, T3}
Join order option 1/4: (T1, T5, T2, T3)
Join order option 2/4: (T5, T1, T2, T3)
Join order option 3/4: (T1, T5, T3, T2)
Join order option 4/4: (T5, T1, T3, T2)

Reproduction of FIG. 5D.

Augmented Anti Join Marker

FIG. 6 depicts an example determination of anti-join marker (AJM) 670 for the outer semi joined table T2 in execution plan 324 (for Q2) of FIG. 3C. As shown in FIG. 6, AJM 670 may be determined by proceeding through three steps for each T1 row in the OSJ operation. First, if any of the disjunctive filter predicates ("T1.ten=1 OR T1.ten=2") are satisfied, then T2.AJM is set to 2 and the evaluation of the current row is completed. This step may be integrated as part of a pre-filter, enabling join evaluation to be skipped if any disjunctive filter predicate is satisfied. Second, if some T2 row satisfies the OSJ join condition of "T1.hundred=T2.hundred", then T2.AJM is set to 0. Third or otherwise, T2.AJM is set to 1. AJM 670 for Q2 is reproduced below:

1. Set T2.AJM to 2 for rows where (T1.ten=1 OR T1.ten=2) is satisfied
2. Set T2.AJM to 0 for rows where some T2 row satisfies T1.hundred=T2.hundred
3. Set T2.AJM to 1 otherwise AJM Value Definitions:
0: Matching row is found/Anti-join marker is 0
1: Matching row is not found/Anti-join marker is set to 1
2: Disjunctive filter predicates evaluate to true Reproduction of FIG. 6.

As discussed above, an AJM value of 0 corresponds to "true" and indicates that a matching row was found in the join (and thus the result row has the semantics of semi-join). An AJM value of 1 corresponds to "false" and indicates that no matching row was found in the join (and thus the result row has the semantics of anti-join). An AJM value of 2 indicates that no join evaluation occurred, since disjunctive filter predicates evaluate to true. Execution layer 129 may automatically provide the "AJM" value when processing an OSJ operation in execution plan 124.

Example Execution Strategy

FIG. 7A depicts execution plan 724 using join order option 3/4 (T1, T5, T3, T2) in join order 560C of FIG. 5D for Query 4. Lines 5-8 of execution plan 724 implement join order option 3/4. Thus, an inner hash join of T1 and T5 happens first at line 4. To perform the hash join, all the rows from the left side (T1), or build side, are retrieved. Note that post join filter (T1.h=1 OR T5.g=99 OR T2.AJM=1 OR T3.AJM=0) is associated with the outer semi-join(s) as they are part of the disjunction. The resulting rows from the inner hash join form the left side of the first OSJ with T3 (line 3). Execution plan 724 for Q4 is reproduced below:

| 0 | SELECT STATEMENT | |
|---|---|---|
| 1 | FILTER | <- filter T2.AJM=1 or T3.AJM=0 or T1.h=1 or T5.g=99 |
| 2 | OSJ | <- (B) |
| 3 |   OSJ | <- (A) |
| 4 |     HASH JOIN | <- join on T1.k = T5.k |
| 5 |       TABLE ACCESS FULL T1 | <- filter T1.z > 19 |
| 6 |       TABLE ACCESS FULL T5 | |
| 7 |     TABLE ACCESS FULL T3 | <- filter T3.f = 7 |
| 8 |   TABLE ACCESS FULL T2 | <- filter T2.d > 5 |

Reproduction of FIG. 7A.

While a hash join is used here, other join types may be used as well, such as sort merge join and nested loop join.

A pre-filter allows bypassing of join evaluation for rows that satisfy disjunctive filter predicates for outer semi-join. A row that satisfies the disjunctive filter predicates (T1.h OR T5.g) is bypassed and does not participate in the first outer semi-join with T3. The rows that do not satisfy the disjunctive filter predicates become the left side of the first outer semi-join. The resulting rows of the first outer semi-join form the left side of the second outer semi-join. A row that satisfies the disjunctive filter predicates (T1.h OR T5.g OR T3,AJM=0) is bypassed and does not participate in the second outer semi-join with T5. The rows that do not satisfy these disjunctive filter predicates become the left side of the second outer semi-join.

Since the amount of work that is performed for an OSJ can be determined based on the projected selectivity of the disjunctive filter predicates, optimizer layer 128 can use the projected selectivity to refine an estimated cost of performing the OSJ to reflect the actual work performed after accounting for the row evaluation bypasses. Similarly, the estimated or actual cardinality of data columns, or the estimated or actual number of distinct values for each data column, can also be used to refine the estimated cost of performing the OSJ, as columns with lower cardinality tend to result in fewer result rows since only the first matching row in a right-side table is provided in an OSJ operation.

As shown in the determination of anti join marker (AJM) 770 in FIG. 7B, the first OSJ with T3 first checks whether "T1.h=1 OR T5.g=99" is satisfied, and if so, sets T3.AJM to 2 (null). Next, the first OSJ checks whether some T3 row satisfies "T5.q>T3.q", and if so, sets T3.AJM to 0 (true). Otherwise, the first OSJ sets T3.AJM to 1 (false). The resulting rows from the first OSJ then form the left side of the second OSJ with T2 (line 2). AJM 770 is reproduced below:

A. T3.AJM
1. Set T3.AJM to 2 for rows where (T1.h=1 OR T5.g=99) is satisfied
2. Set T3.AJM to 0 for rows where some T3 row satisfies T5.q>T3.q
3. Set T3.AJM to 1 otherwise B. T2.AJM
1. Set T2.AJM to 2 for rows where (T1.h=1 OR T5.g=99 or T3.AJM=0) is satisfied
2. Set T2.AJM to 0 for rows where some T2 row satisfies T1.p=T2.p
3. Set T2.AJM to 1 otherwise Reproduction of FIG. 7B.

As shown in the determination of anti join marker (AJM) 770 in FIG. 7B, the second OSJ with T2 first checks whether "T1.h=1 OR T5.g=99 OR T3.AJM=0" is satisfied, and if so, sets T2.AJM to 2. Next, the second OSJ checks whether some T2 row satisfies "T1.q=T2.q", and if so, sets T2.AJM to 0. Otherwise, the second OSJ sets T2.AJM to 1.

The resulting rows from the second OSJ are then processed through the post-join filter predicates (line 1), or "T2.AJM=1 OR T3.AJM=0 OR T1.h=1 OR T5.g=99". If the disjunctive filter predicates are not satisfied, the result row is not returned. Otherwise, the result row is returned to answer the original database query (line 0).

Existing Disjunctive Subquery Unnesting Techniques

FIG. 8 depicts an external query 842 (Q6) using a first class of disjunctive subqueries and an unnested version using existing techniques without OSJ as internal query 825. External query 842 may correspond to external query 142, and internal query 825 may correspond to internal query 125. The first class of disjunctive subqueries includes multiple IN, EXISTS, or ANY subqueries that appear in a disjunction in the outer query block's WHERE clause, and requires the outer query block's columns in the connecting or correlating conditions of the subqueries to be the same. For example, referring to external query 842, it is observed that the same outer block column, "T2.x", appears in the connecting condition and correlating conditions of the IN and EXISTS subqueries, respectively. External query 842 (Q6) is reproduced below:

Query Q6.

```
SELECT T1.x
FROM T1, T2
WHERE T1.y = T2.y and
    (T2.x IN (SELECT T3.a
        FROM T3
        WHERE T3.a = T2.x)
    OR
    EXISTS (SELECT 1
        FROM T4, T5
        WHERE T4.k = T5.k and
            T4.m > 1 and T4.b = T2.x));
```

A proposed unnesting of external query 842 (Q6) is shown as internal query 825A (Q7), which includes a UNION ALL view and a semi-join ("S="). This approach may introduce significant processing overhead when compared to unnesting using OSJ, which does not require the generation of a UNION ALL view. Internal query 825A is reproduced below:

Query Q7.

```
SELECT T1.x
FROM T1, T2,
    (SELECT T3.a as Z
    FROM T3
    UNION ALL
    SELECT T4.b AS Z
    FROM T4, T5
    WHERE T4.k = T5.k and T4.m > 1) V
WHERE T1.y = T2.y and T2.x S= V.Z;
```

A proposed unnesting of external query 842 (Q6) using OSJ is shown as internal query 825B (Q7o). Q7o is more efficient than Q7. Note that an inline view V has been introduced in Q7o to represent the second subquery, as it contains multiple tables. Internal query 825B is reproduced below:

Query Q7o.

```
SELECT T1.x
FROM T1, T2, T3, (SELECT T4.b
    FROM T4, T5
    WHERE T4.k = T5.k and T4.m > 1) V
WHERE T1.y = T2.y and T2.x OSJ= T3.a and T2.x OSJ= V.b
    (T3.AJM = 0 OR V.AJM = 0);
```

FIG. 9 depicts an external query 942 (Q8) using a second class of disjunctive subqueries and an unnested version using existing techniques without OSJ as internal query 925. External query 942 may correspond to external query 142, and internal query 925 may correspond to internal query 125. In the second class of disjunctive subqueries, IN, EXISTS, or ANY subqueries contain disjunctive correlation predicates in their WHERE clause. For example, referring to external query 942, it is observed that the EXISTS subquery correlates "T1.hundred" in disjunction. External query 942 is reproduced below:

---
Query Q8.
---
SELECT T1.ten
FROM G_4K T1
WHERE EXISTS (SELECT 1
    FROM H_4K T2, T_5K T3
    WHERE T2.thousand = T3.thousand and
    T2.ten > 7 AND
    (T2.hundred = T1.hundred OR
    T3.ten = T1.hundred));
---

A proposed unnesting of external query 942 is shown as internal query 925A (Q9), which includes a UNION ALL view and a semi-join ("S="). Since each branch of the UNION ALL requires a duplication of the subquery tables ("H_4K T2, T_5K T3") and the join operations ("T2.thousand=T3.thousand"), this approach may introduce significant processing overhead when compared to unnesting using OSJ, which does not require the generation of a UNION ALL view. Internal query 925A (Q9) is reproduced below:

---
Query Q9.
---
SELECT T1.ten
FROM G_4K T1,
    (SELECT T2.hundred Z
    FROM H_4K T2, T_5K T3
    WHERE T2.thousand = T3.thousand AND T2.ten > 7
    UNION ALL
    SELECT T3.ten Z
    FROM H_4K T2, T_5K T3
    WHERE T2.thousand = T3.thousand AND T2.ten > 7) V
WHERE T1.hundred S= V.Z;
---

A proposed unnesting of external query Q8 using OSJ is shown as internal query 925B (Q10), which is more efficient than Q9. Internal query 925B is reproduced below:

---
Query Q10.
---
SELECT T1.ten
FROM G_4K T1,
    (SELECT T2.hundred Z
    FROM H_4K T2, T_5K T3
    WHERE T2.thousand = T3.thousand AND T2.ten > 7) V1,
    (SELECT T3.ten Z
    FROM H_4K T2, T_5K T3
    WHERE T2.thousand = T3.thousand AND T2.ten > 7) V2
WHERE T1.hundred OSJ= V1.Z and T1.hundred OSJ= V2.Z and
    (V1.AJM = 0 OR V2.AJM = 0);
---

Example Process for Using Outer Semi-Join

Figure 10:
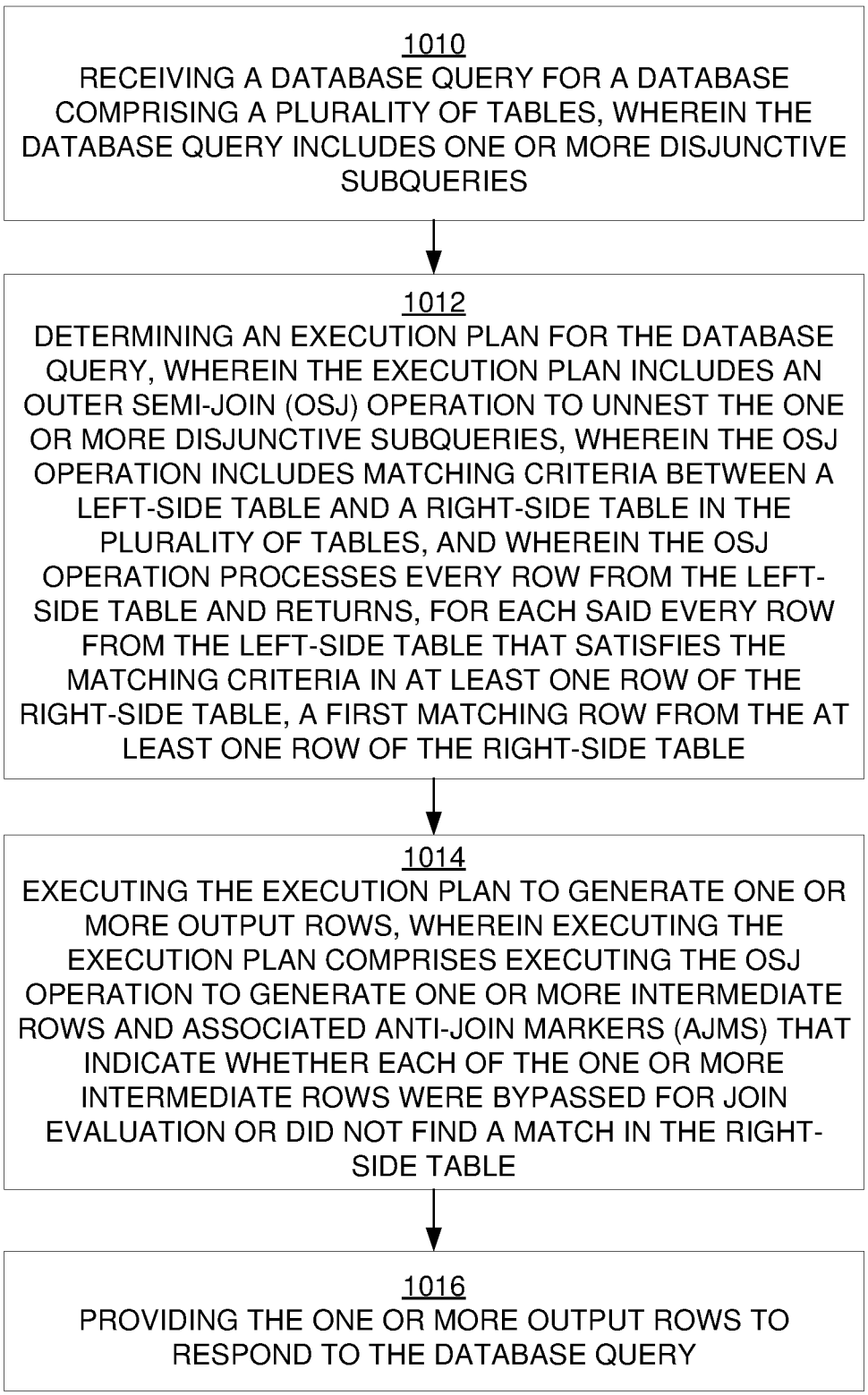
FIG. 10 is a flow diagram that depicts an example process for using outer semi-join operations to optimize execution plans of database queries.

FIG. 10 is a flow diagram that depicts an example process 1000 that database management system 110 may perform to use outer semi-join operations to optimize execution plans of database queries.

Referring to FIG. 1, in block 1010, database management system 110 receives external query 142 for database 132 comprising a plurality of tables, wherein external query 142 includes one or more disjunctive subqueries such as disjunctive subquery 144A, 144B, and 144C. For example, a user of client device 140 may operate a database client to provide a SQL query as external query 142, which is then transmitted to database management system 110 via network 150, and then delegated to a specific database server instance, such as database server instance 122. For the purposes of illustration, external query 142 may correspond to external query 342 (Q1).

In block 1012, optimizer layer 128 determines execution plan 124 for external query 142, wherein the execution plan includes an outer semi-join (OSJ) operation to unnest the one or more disjunctive subqueries, wherein the OSJ operation includes matching criteria between a left-side table and a right-side table in the plurality of tables, and wherein the OSJ operation processes every row from the left-side table and returns, for each said every row from the left-side table that satisfies the matching criteria in at least one row of the right-side table, a first matching row from the at least one row of the right-side table. For example, as discussed above in conjunction with internal query 225D of FIG. 2B, the outer semi join combines the semantics of left-outer join (processing every row from the left-side table) and semi-join (returning corresponding first matching rows from the right-side table). As described above, the OSJ operation can unnest disjunctive subqueries. For example, referring to external query 342, disjunctive subquery 344A is the one or more disjunctive subqueries, and internal query 325 includes an OSJ operation that includes matching criteria (T1.hundred=T2.hundred) between a left-side table T1 and a right-side table T2 to unnest disjunctive subquery 344A. Execution plan 324, which may correspond to execution plan 124, reflects the OSJ operation in line 2.

In block 1014, execution layer 129 executes execution plan 124 to generate one or more output rows, wherein executing the execution plan comprises executing the OSJ operation to generate one or more intermediate rows and associated anti-join markers (AJMs) that indicate whether each of the one or more intermediate rows were bypassed for join evaluation or did not find a match in the right-side table. For example, referring to FIG. 6, steps are illustrated in AJM 670 to determine the AJMs for each row of T1 processed in the OSJ operation. As discussed previously, the first step of AJM 670 may be used as part of a pre-filter to skip evaluation of rows that already satisfy one of the disjunctive filter predicates.

In block 1016, execution layer 129 provides the one or more output rows from block 1014 back to client device 140 to respond to the original external query 142. Client device 140 may then display the output rows in an interactive text or graphical terminal display, or use the output rows for further processing in an interactive application program, a client/server or peer-to-peer service, an automated script or data processing job, or any other use case.

Database Overview

Embodiments of the present invention are used in the context of database management systems (DBMSs). Therefore, a description of an example DBMS is provided.

Generally, a server, such as a database server, is a combination of integrated software components and an allocation of computational resources, such as memory, a node, and processes on the node for executing the integrated software components, where the combination of the software and computational resources are dedicated to providing a particular type of function on behalf of clients of the server. A database server governs and facilitates access to a particular database, processing requests by clients to access the database.

A database comprises data and metadata that is stored on a persistent memory mechanism, such as a set of hard disks. Such data and metadata may be stored in a database logically, for example, according to relational and/or object-relational database constructs.

Users interact with a database server of a DBMS by submitting to the database server commands that cause the database server to perform operations on data stored in a database. A user may be one or more applications running on a client computer that interact with a database server. Multiple users may also be referred to herein collectively as a user.

A database command may be in the form of a database statement. For the database server to process the database statements, the database statements must conform to a database language supported by the database server. One non-limiting example of a database language that is supported by many database servers is SQL, including proprietary forms of SQL supported by such database servers as Oracle, (e.g. Oracle Database 11g). SQL data definition language ("DDL") instructions are issued to a database server to create or configure database objects, such as tables, views, or complex types. Data manipulation language ("DML") instructions are issued to a DBMS to manage data stored within a database structure. For instance, SELECT, INSERT, UPDATE, and DELETE are common examples of DML instructions found in some SQL implementations. SQL/XML is a common extension of SQL used when manipulating XML data in an object-relational database.

Generally, data is stored in a database in one or more data containers, each container contains records, and the data within each record is organized into one or more fields. In relational database systems, the data containers are typically referred to as tables, the records are referred to as rows, and the fields are referred to as columns. In object-oriented databases, the data containers are typically referred to as object classes, the records are referred to as objects, and the fields are referred to as attributes. Other database architectures may use other terminology. Systems that implement the present invention are not limited to any particular type of data container or database architecture. However, for the purpose of explanation, the examples and the terminology used herein shall be that typically associated with relational or object-relational databases. Thus, the terms "table", "row" and "column" shall be used herein to refer respectively to the data container, record, and field.

Query Optimization and Execution Plans

Query optimization generates one or more different candidate execution plans for a query, which are evaluated by the query optimizer to determine which execution plan should be used to compute the query.

Execution plans may be represented by a graph of interlinked nodes, each representing an plan operator or row sources. The hierarchy of the graphs (i.e., directed tree) represents the order in which the execution plan operators are performed and how data flows between each of the execution plan operators.

An operator, as the term is used herein, comprises one or more routines or functions that are configured for performing operations on input rows or tuples to generate an output set of rows or tuples. The operations may use interim data structures. Output set of rows or tuples may be used as input rows or tuples for a parent operator.

An operator may be executed by one or more computer processes or threads. Referring to an operator as performing an operation means that a process or thread executing functions or routines of an operator are performing the operation.

A row source performs operations on input rows and generates output rows, which may serve as input to another row source. The output rows may be new rows, and or a version of the input rows that have been transformed by the row source.

A match operator of a path pattern expression performs operations on a set of input matching vertices and generates a set of output matching vertices, which may serve as input to another match operator in the path pattern expression. The match operator performs logic over multiple vertex/edges to generate the set of output matching vertices for a specific hop of a target pattern corresponding to the path pattern expression.

An execution plan operator generates a set of rows (which may be referred to as a table) as output and execution plan operations include, for example, a table scan, an index scan, sort-merge join, nested-loop join, filter, and importantly, a full outer join.

A query optimizer may optimize a query by transforming the query. In general, transforming a query involves rewriting a query into another semantically equivalent query that should produce the same result and that can potentially be executed more efficiently, i.e. one for which a potentially more efficient and less costly execution plan can be generated. Examples of query transformation include view merging, subquery unnesting, predicate move-around and push-down, common subexpression elimination, outer-to-inner join conversion, materialized view rewrite, and star transformation.

Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 11:
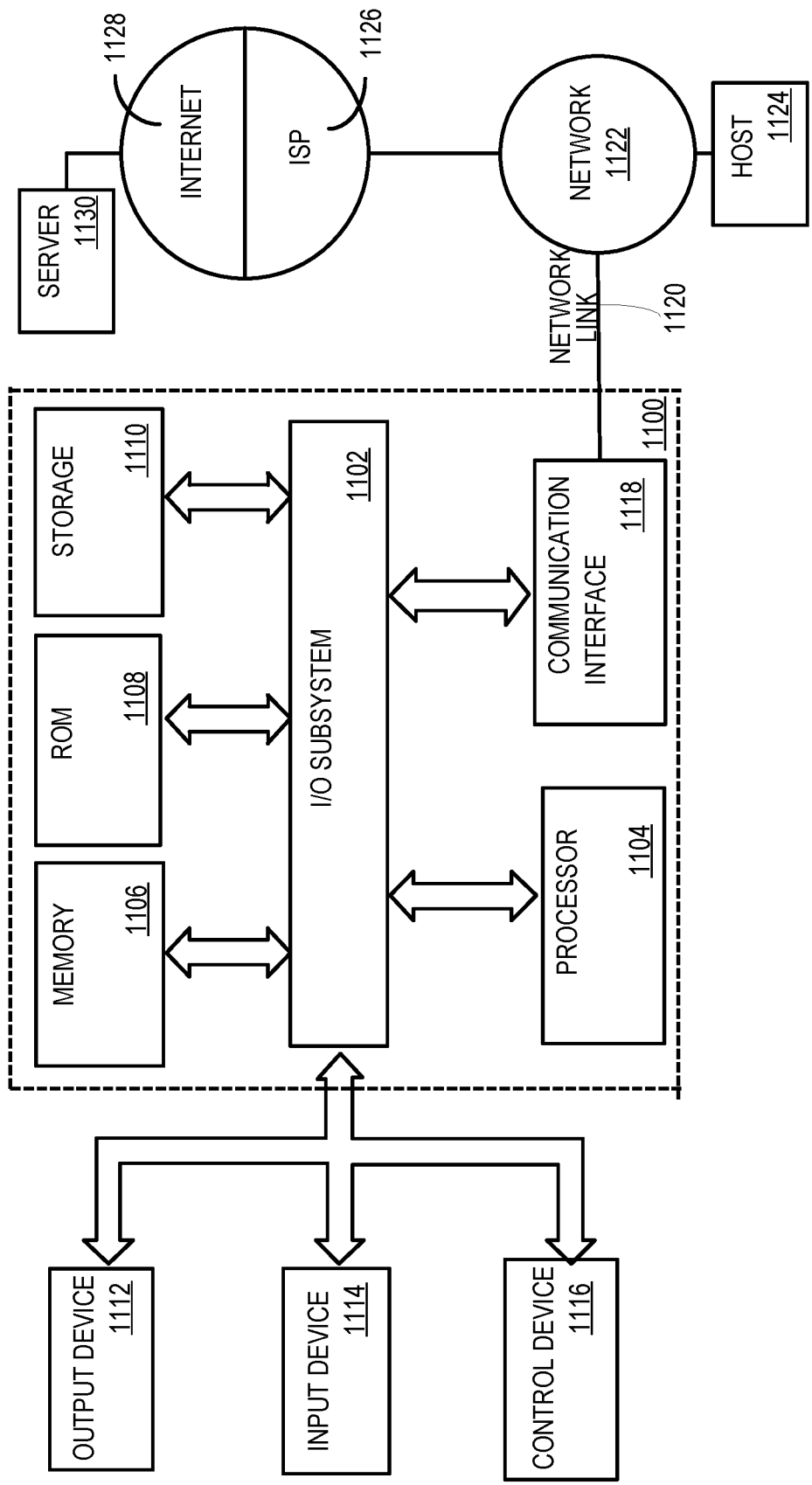
FIG. 11 illustrates a block diagram of a computing device in which the example embodiment(s) of the present invention may be embodiment.

For example, FIG. 11 is a block diagram that illustrates a computer system 1100 upon which an embodiment of the invention may be implemented. Computer system 1100 includes a bus 1102 or other communication mechanism for communicating information, and a hardware processor 1104 coupled with bus 1102 for processing information. Hardware processor 1104 may be, for example, a general purpose microprocessor.

Computer system 1100 also includes a main memory 1106, such as a random access memory (RAM) or other dynamic storage device, coupled to bus 1102 for storing information and instructions to be executed by processor 1104. Main memory 1106 also may be used for storing temporary variables or other intermediate information during execution of instructions to be executed by processor 1104. Such instructions, when stored in non-transitory storage media accessible to processor 1104, render computer system 1100 into a special-purpose machine that is customized to perform the operations specified in the instructions.

Computer system 1100 further includes a read only memory (ROM) 1108 or other static storage device coupled to bus 1102 for storing static information and instructions for processor 1104. A storage device 1110, such as a magnetic disk, optical disk, or solid-state drive is provided and coupled to bus 1102 for storing information and instructions.

Computer system 1100 may be coupled via bus 1102 to a display 1112, such as a cathode ray tube (CRT), for displaying information to a computer user. An input device 1114, including alphanumeric and other keys, is coupled to bus 1102 for communicating information and command selections to processor 1104. Another type of user input device is cursor control 1116, such as a mouse, a trackball, or cursor direction keys for communicating direction information and command selections to processor 1104 and for controlling cursor movement on display 1112. This input device typically has two degrees of freedom in two axes, a first axis (e.g., x) and a second axis (e.g., y), that allows the device to specify positions in a plane.

Computer system 1100 may implement the techniques described herein using customized hard-wired logic, one or more ASICs or FPGAs, firmware and/or program logic which in combination with the computer system causes or programs computer system 1100 to be a special-purpose machine. According to one embodiment, the techniques herein are performed by computer system 1100 in response to processor 1104 executing one or more sequences of one or more instructions contained in main memory 1106. Such instructions may be read into main memory 1106 from another storage medium, such as storage device 1110. Execution of the sequences of instructions contained in main memory 1106 causes processor 1104 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical disks, magnetic disks, or solid-state drives, such as storage device 1110. Volatile media includes dynamic memory, such as main memory 1106. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 1102. Transmission media can also take the form of acoustic or light waves, such as those generated during radio-wave and infra-red data communications.

Various forms of media may be involved in carrying one or more sequences of one or more instructions to processor 1104 for execution. For example, the instructions may initially be carried on a magnetic disk or solid-state drive of a remote computer. The remote computer can load the instructions into its dynamic memory and send the instructions over a telephone line using a modem. A modem local to computer system 1100 can receive the data on the telephone line and use an infra-red transmitter to convert the data to an infra-red signal. An infra-red detector can receive the data carried in the infra-red signal and appropriate circuitry can place the data on bus 1102. Bus 1102 carries the data to main memory 1106, from which processor 1104 retrieves and executes the instructions. The instructions received by main memory 1106 may optionally be stored on storage device 1110 either before or after execution by processor 1104.

Computer system 1100 also includes a communication interface 1118 coupled to bus 1102. Communication interface 1118 provides a two-way data communication coupling to a network link 1120 that is connected to a local network 1122. For example, communication interface 1118 may be an integrated services digital network (ISDN) card, cable modem, satellite modem, or a modem to provide a data communication connection to a corresponding type of telephone line. As another example, communication interface 1118 may be a local area network (LAN) card to provide a data communication connection to a compatible LAN. Wireless links may also be implemented. In any such implementation, communication interface 1118 sends and receives electrical, electromagnetic, or optical signals that carry digital data streams representing various types of information.

Network link 1120 typically provides data communication through one or more networks to other data devices. For example, network link 1120 may provide a connection through local network 1122 to a host computer 1124 or to data equipment operated by an Internet Service Provider (ISP) 1126. ISP 1126 in turn provides data communication services through the worldwide packet data communication network now commonly referred to as the "Internet" 1128. Local network 1122 and Internet 1128 both use electrical, electromagnetic, or optical signals that carry digital data streams. The signals through the various networks and the signals on network link 1120 and through communication interface 1118, which carry the digital data to and from computer system 1100, are example forms of transmission media.

Computer system 1100 can send messages and receive data, including program code, through the network(s), network link 1120 and communication interface 1118. In the Internet example, a server 1130 might transmit a requested code for an application program through Internet 1128, ISP 1126, local network 1122 and communication interface 1118.

The received code may be executed by processor 1104 as it is received, and/or stored in storage device 1110, or other non-volatile storage for later execution.

A computer system process comprises an allotment of hardware processor time, and an allotment of memory (physical and/or virtual), the allotment of memory being for storing instructions executed by the hardware processor, for storing data generated by the hardware processor executing the instructions, and/or for storing the hardware processor state (e.g. content of registers) between allotments of the hardware processor time when the computer system process is not running. Computer system processes run under the control of an operating system, and may run under the control of other programs being executed on the computer system.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

Software Overview

Figure 12:
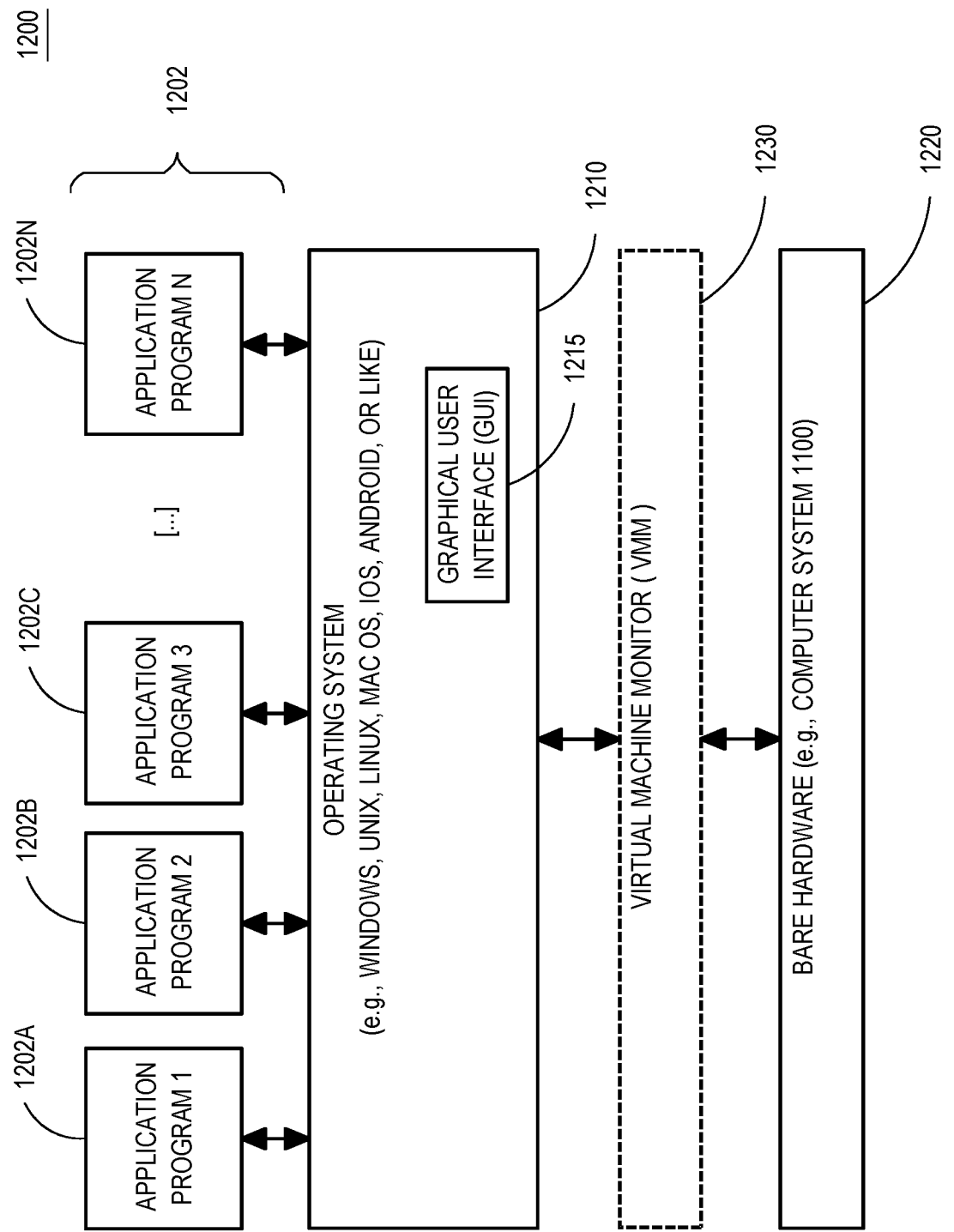
FIG. 12 illustrates a block diagram of a basic software system for controlling the operation of a computing device.

FIG. 12 is a block diagram of a basic software system 1200 that may be employed for controlling the operation of computing device 1100. Software system 1200 and its components, including their connections, relationships, and functions, is meant to be exemplary only, and not meant to limit implementations of the example embodiment(s). Other software systems suitable for implementing the example embodiment(s) may have different components, including components with different connections, relationships, and functions.

Software system 1200 is provided for directing the operation of computing device 1100. Software system 1200, which may be stored in system memory (RAM) 1106 and on fixed storage (e.g., hard disk or flash memory) 1110, includes a kernel or operating system (OS) 1210.

The OS 1210 manages low-level aspects of computer operation, including managing execution of processes, memory allocation, file input and output (I/O), and device I/O. One or more application programs, represented as 1202A, 1202B, 1202C . . . 1202N, may be "loaded" (e.g., transferred from fixed storage 1110 into memory 1106) for execution by the system 1200. The applications or other software intended for use on device 1100 may also be stored as a set of downloadable computer-executable instructions, for example, for downloading and installation from an Internet location (e.g., a Web server, an app store, or other online service).

Software system 1200 includes a graphical user interface (GUI) 1215, for receiving user commands and data in a graphical (e.g., "point-and-click" or "touch gesture") fashion. These inputs, in turn, may be acted upon by the system 1200 in accordance with instructions from operating system 1210 and/or application(s) 1202. The GUI 1215 also serves to display the results of operation from the OS 1210 and application(s) 1202, whereupon the user may supply additional inputs or terminate the session (e.g., log off).

OS 1210 can execute directly on the bare hardware 1220 (e.g., processor(s) 1104) of device 1100. Alternatively, a hypervisor or virtual machine monitor (VMM) 1230 may be interposed between the bare hardware 1220 and the OS 1210. In this configuration, VMM 1230 acts as a software "cushion" or virtualization layer between the OS 1210 and the bare hardware 1220 of the device 1100.

VMM 1230 instantiates and runs one or more virtual machine instances ("guest machines"). Each guest machine comprises a "guest" operating system, such as OS 1210, and one or more applications, such as application(s) 1202, designed to execute on the guest operating system. The VMM 1230 presents the guest operating systems with a virtual operating platform and manages the execution of the guest operating systems.

In some instances, the VMM 1230 may allow a guest operating system to run as if it is running on the bare hardware 1220 of device 1100 directly. In these instances, the same version of the guest operating system configured to execute on the bare hardware 1220 directly may also execute on VMM 1230 without modification or reconfiguration. In other words, VMM 1230 may provide full hardware and CPU virtualization to a guest operating system in some instances.

In other instances, a guest operating system may be specially designed or configured to execute on VMM 1230 for efficiency. In these instances, the guest operating system is "aware" that it executes on a virtual machine monitor. In other words, VMM 1230 may provide para-virtualization to a guest operating system in some instances.

The above-described basic computer hardware and software is presented for purpose of illustrating the basic underlying computer components that may be employed for implementing the example embodiment(s). The example embodiment(s), however, are not necessarily limited to any particular computing environment or computing device configuration. Instead, the example embodiment(s) may be implemented in any type of system architecture or processing environment that one skilled in the art, in light of this disclosure, would understand as capable of supporting the features and functions of the example embodiment(s) presented herein.

EXTENSIONS AND ALTERNATIVES

Although some of the figures described in the foregoing specification include flow diagrams with steps that are shown in an order, the steps may be performed in any order, and are not limited to the order shown in those flowcharts. Additionally, some steps may be optional, may be performed multiple times, and/or may be performed by different components. All steps, operations and functions of a flow diagram that are described herein are intended to indicate operations that are performed using programming in a special-purpose computer or general-purpose computer, in various embodiments. In other words, each flow diagram in this disclosure, in combination with the related text herein, is a guide, plan or specification of all or part of an algorithm for programming a computer to execute the functions that are described. The level of skill in the field associated with this disclosure is known to be high, and therefore the flow diagrams and related text in this disclosure have been prepared to convey information at a level of sufficiency and detail that is normally expected in the field when skilled persons communicate among themselves with respect to programs, algorithms and their implementation.

In the foregoing specification, the example embodiment(s) of the present invention have been described with reference to numerous specific details. However, the details may vary from implementation to implementation according to the requirements of the particular implement at hand. The example embodiment(s) are, accordingly, to be regarded in an illustrative rather than a restrictive sense.

What is claimed is:

1. A method comprising:
    receiving a database query for a database comprising a plurality of tables, wherein the database query includes one or more disjunctive subqueries; and
    determining an execution plan for the database query, wherein the execution plan includes an outer semi-join (OSJ) operation to unnest the one or more disjunctive subqueries, wherein the OSJ operation includes matching criteria between a left-side table and a right-side table in the plurality of tables, and wherein the OSJ operation processes every row from the left-side table and returns, for each said every row from the left-side table that satisfies the matching criteria in at least one row of the right-side table, no more than a first matching row from the at least one row of the right-side table and an anti-join marker (AJM).

2. The method of claim 1, wherein the one or more disjunctive subqueries include correlated predicates.

3. The method of claim 1, wherein the one or more disjunctive subqueries is further in disjunction with one or more filter predicates.

4. The method of claim 1, further comprising:
executing the execution plan to generate one or more output rows, wherein executing the execution plan comprises executing the OSJ operation to generate one or more intermediate rows and associated AJMs that indicate whether each of the one or more intermediate rows were bypassed for join evaluation or did not find a match in the right-side table; and
providing the one or more output rows to respond to the database query.

5. The method of claim 4, wherein executing the OSJ operation includes applying a pre-filter to bypass an evaluation of the one or more intermediate rows that satisfy at least one filter predicate in disjunction with the one or more disjunctive subqueries.

6. The method of claim 1, wherein the one or more disjunctive subqueries include multiple IN, EXISTS, or ANY subqueries appearing in disjunction in a WHERE clause of an outer query block, wherein the OSJ operation unnests the multiple IN, EXISTS, or ANY subqueries into a semi-join operation, and wherein columns of the outer query block in connecting or correlating conditions of the multiple IN, EXISTS, or ANY subqueries are the same.

7. The method of claim 1, wherein the one or more disjunctive subqueries include IN, EXISTS, or ANY subqueries containing disjunctive correlation predicates in their WHERE clause.

8. The method of claim 1, wherein the one or more disjunctive subqueries include multiple NOT IN, ALL, or NOT EXISTS subqueries appearing in disjunction in a WHERE clause of an outer query block, wherein the OSJ operation unnests the multiple NOT IN, ALL, or NOT EXISTS subqueries into an anti-join operation, and wherein columns of the outer query block in connecting or correlating conditions of the multiple IN, EXISTS, or ANY subqueries are the same.

9. The method of claim 1, wherein the OSJ operation causes a partial join order to be enforced for the execution plan such that tables participating in asymmetric joins in the OSJ operation are joined after other tables of the OSJ operation, and such that tables participating in one or more filter predicates in disjunction with the one or more disjunctive subqueries are joined before tables of the OSJ operation.

10. The method of claim 1, wherein determining the execution plan comprises estimating a cost of the OSJ operation based on at least one of:
an estimated selectivity of at least one filter predicate; or
a cardinality of one or more columns from the right-side table.

11. One or more non-transitory computer-readable media storing instructions that, when executed by one or more processors, cause:
receiving a database query for a database comprising a plurality of tables, wherein the database query includes one or more disjunctive subqueries; and
determining an execution plan for the database query, wherein the execution plan includes an outer semi-join (OSJ) operation to unnest the one or more disjunctive subqueries, wherein the OSJ operation includes matching criteria between a left-side table and a right-side table in the plurality of tables, and wherein the OSJ operation processes every row from the left-side table and returns, for each said every row from the left-side table that satisfies the matching criteria in at least one row of the right-side table, no more than a first matching row from the at least one row of the right-side table and an anti-join marker (AJM).

12. The one or more non-transitory computer-readable media of claim 11, wherein the one or more disjunctive subqueries include correlated predicates.

13. The one or more non-transitory computer-readable media of claim 11, wherein the one or more disjunctive subqueries is further in disjunction with one or more filter predicates.

14. The one or more non-transitory computer-readable media of claim 11, wherein the instructions further cause:
executing the execution plan to generate one or more output rows, wherein executing the execution plan comprises executing the OSJ operation to generate one or more intermediate rows and associated AJMs that indicate whether each of the one or more intermediate rows were bypassed for join evaluation or did not find a match in the right-side table; and
providing the one or more output rows to respond to the database query.

15. The one or more non-transitory computer-readable media of claim 14, wherein the
instructions cause executing the OSJ operation to include:
applying a pre-filter to bypass an evaluation of the one or more intermediate rows that satisfy at least one filter predicate in disjunction with the one or more disjunctive subqueries.

16. The one or more non-transitory computer-readable media of claim 11, wherein the one or more disjunctive subqueries include multiple IN, EXISTS, or ANY subqueries appearing in disjunction in a WHERE clause of an outer query block, wherein the OSJ operation unnests the multiple IN, EXISTS, or ANY subqueries into a semi-join operation, and wherein columns of the outer query block in connecting or correlating conditions of the multiple IN, EXISTS, or ANY subqueries are the same.

17. The one or more non-transitory computer-readable media of claim 11, wherein the one or more disjunctive subqueries include IN, EXISTS, or ANY subqueries containing disjunctive correlation predicates in their WHERE clause.

18. The one or more non-transitory computer-readable media of claim 11, wherein the one or more disjunctive subqueries include multiple NOT IN, ALL, or NOT EXISTS subqueries appearing in disjunction in a WHERE clause of an outer query block, wherein the OSJ operation unnests the multiple NOT IN, ALL, or NOT EXISTS subqueries into an anti-join operation, and wherein columns of the outer query block in connecting or correlating conditions of the multiple IN, EXISTS, or ANY subqueries are the same.

19. The one or more non-transitory computer-readable media of claim 11, wherein the OSJ operation causes a partial join order to be enforced for the execution plan such that tables participating in asymmetric joins in the OSJ operation are joined after other tables of the OSJ operation, and such that tables participating in one or more filter predicates in disjunction with the one or more disjunctive subqueries are joined before tables of the OSJ operation.

20. The one or more non-transitory computer-readable media of claim 11, wherein the instructions cause determining the execution plan to comprise estimating a cost of the OSJ operation based on at least one of:
 an estimated selectivity of at least one filter predicate; and
 a cardinality of one or more columns from the right-side table.

* * * * *

UNITED STATES PATENT AND TRADEMARK OFFICE
CERTIFICATE OF CORRECTION

PATENT NO. : 12,197,439 B2
APPLICATION NO. : 17/966036
DATED : January 14, 2025
INVENTOR(S) : Ahmed et al.

It is certified that error appears in the above-identified patent and that said Letters Patent is hereby corrected as shown below:

In the Specification

In Column 1, Line 20, delete "anti join" and insert -- anti-join --, therefor.

In Column 1, Line 33, delete "anti join" and insert -- anti-join --, therefor.

In Column 2, Line 58, delete "anti join" and insert -- anti-join --, therefor.

In Column 5, Line 11, delete "T1. a1" and insert -- T1.a1 --, therefor.

In Column 5, Line 52, delete "anti join" and insert -- anti-join --, therefor.

In Column 6, Line 25, delete "anti join" and insert -- anti-join --, therefor.

In Column 6, Line 32, delete "anti join" and insert -- anti-join --, therefor.

In Column 6, Line 47, delete "anti join" and insert -- anti-join --, therefor.

In Column 6, Line 49, delete "anti join" and insert -- anti-join --, therefor.

In Column 7, Line 59, delete "OUTERSEMI" and insert -- OUTER SEMI --, therefor.

In Column 8, Line 66, delete "anti join" and insert -- anti-join --, therefor.

In Column 16, Line 6, delete "and or" and insert -- and/or --, therefor.

Signed and Sealed this
Eighth Day of April, 2025

Coke Morgan Stewart
*Acting Director of the United States Patent and Trademark Office*